US010883429B2

(12) United States Patent
Yonekura et al.

(10) Patent No.: US 10,883,429 B2
(45) Date of Patent: Jan. 5, 2021

(54) INTAKE CONTROL METHOD AND INTAKE CONTROL DEVICE FOR INTERNAL COMBUSTION ENGINE

(71) Applicants: NISSAN MOTOR CO., LTD., Yokohama (JP); RENAULT S.A.S., Boulogne-Billancourt (FR)

(72) Inventors: Kengo Yonekura, Kanagawa (JP); Hirofumi Tsuchida, Kanagawa (JP); Takayuki Hamamoto, Kanagawa (JP)

(73) Assignees: NISSAN MOTOR CO., LTD., Yokohama (JP); RENAULT S.A.S., Boulogne-Billancourt (FR)

( * ) Notice: Subject to any disclaimer, the term of this patent is extended or adjusted under 35 U.S.C. 154(b) by 0 days.

(21) Appl. No.: 16/476,952

(22) PCT Filed: Feb. 1, 2017

(86) PCT No.: PCT/JP2017/003624

§ 371 (c)(1),
(2) Date: Jul. 10, 2019

(87) PCT Pub. No.: WO2018/142510

PCT Pub. Date: Aug. 9, 2018

(65) Prior Publication Data

US 2019/0331035 A1 Oct. 31, 2019

(51) Int. Cl.

| | |
|---|---|
| ***F02D 41/00*** | (2006.01) |
| ***F02M 26/02*** | (2016.01) |
| *F02M 26/00* | (2016.01) |

(52) U.S. Cl.

CPC ..... *F02D 41/0002* (2013.01); *F02D 41/0047* (2013.01); *F02M 26/02* (2016.02); *F02M 2026/001* (2016.02)

(58) Field of Classification Search

CPC ............... F02M 26/02; F02M 2026/00; F02M 2026/001; F02D 41/00; F02D 41/0002; F02D 41/0047

(Continued)

(56) References Cited

U.S. PATENT DOCUMENTS 6,039,025 A 3/2000 Iwano et al.
6,227,182 B1 * 5/2001 Muraki .................. F02D 21/08 123/568.21

(Continued)

FOREIGN PATENT DOCUMENTS

EP 2 128 407 A1 12/2009
EP 2 829 711 A1 1/2015

(Continued)

*Primary Examiner* — John Kwon
*Assistant Examiner* — Johnny H Hoang
(74) *Attorney, Agent, or Firm* — Foley & Lardner LLP

(57) ABSTRACT

An intake control method for an internal combustion engine equipped with a low-pressure EGR system includes setting a target intake pressure, which is a target value of an intake pressure in an intake passage between a negative pressure generating valve and an intake throttle valve, necessary for performing EGR control in a state of an exhaust pressure determined for each operating point, setting a target total opening area, which is a sum of a target opening area of an EGR valve and a target opening area of the negative pressure generating valve, on the basis of the target intake pressure, a target fresh air amount, and a target EGR gas amount, setting a target EGR valve opening area, which is an opening area of the EGR valve for achieving the target EGR gas amount, assuming that the negative pressure generating valve is fully open, and setting a value obtained by subtracting the target EGR valve opening area from the target total opening area to be a target negative pressure generating (Continued)

valve opening area, which is a target value of an opening area of the negative pressure generating valve.

5 Claims, 7 Drawing Sheets

(58) Field of Classification Search
USPC .... 123/568.14–568.16, 568.19, 568.22, 676; 701/108
See application file for complete search history.

(56) References Cited

U.S. PATENT DOCUMENTS

| | | | | |
|---|---|---|---|---|
| 7,275,525 | B2 * | 10/2007 | Miyasako | F02B 77/082 123/568.16 |
| 2008/0295514 | A1 | 12/2008 | Ono | |
| 2011/0308503 | A1 | 12/2011 | Yasui et al. | |
| 2011/0315128 | A1 * | 12/2011 | Yokoo | F02D 13/0273 123/568.11 |
| 2015/0345415 | A1 | 12/2015 | Shim et al. | |

FOREIGN PATENT DOCUMENTS

| | | | |
|---|---|---|---|
| JP | 2000-356162 | A | 12/2000 |
| JP | 3511849 | B2 | 3/2004 |
| JP | 2008-248729 | A | 10/2008 |
| WO | WO 2014/104628 | A1 | 7/2014 |

* cited by examiner

INTAKE CONTROL METHOD AND INTAKE CONTROL DEVICE FOR INTERNAL COMBUSTION ENGINE

TECHNICAL FIELD

The present invention relates to intake control for an internal combustion engine.

BACKGROUND ART

An internal combustion engine equipped with an exhaust gas recirculation device (hereinafter, also called EGR device) that recirculates a portion of the exhaust gas back into the intake line for improving fuel economy performance and environmental performance is known. Japanese Patent No. 3511849 discloses intake control for an internal combustion engine equipped with an EGR device. In this document, firstly, a total fresh air amount is calculated which is a sum of an intake air amount and a fresh-air equivalent amount that is obtained by converting the amount of recirculated exhaust gas (hereinafter, also called EGR gas) to the amount of air (hereinafter, also called fresh air) in the atmosphere. Next, a total opening area of an intake throttle valve and an EGR valve is calculated on the basis of the total fresh air amount. The total opening area is allocated at a ratio between the intake air amount and the fresh-air equivalent amount to thereby determine the opening area of the intake throttle valve and the opening area of the EGR valve. According to the control in this document, the intake air amount and the ratio of introduced EGR gas (hereinafter, also called EGR ratio) can be controlled with accuracy, regardless of the temperature, pressure, or other state of the EGR gas.

SUMMARY OF INVENTION

The control in the above document is intended for a so-called high-pressure EGR system (hereinafter, also called HP-EGR system) in which the EGR gas is introduced into a portion downstream of the intake throttle valve in the intake flow. In the portion downstream of the intake throttle valve in the intake flow, a negative pressure develops when the opening degree of the intake throttle valve decreases. Accordingly, in the HP-EGR system, a differential pressure between the exhaust side and the intake side necessary for recirculating the EGR gas is secured by the negative pressure that develops with the decrease in opening degree of the intake throttle valve.

On the other hand, for enabling EGR control in a wider operating region, a so-called low-pressure EGR system (hereinafter, also called LP-EGR system) has recently been proposed in which the EGR gas is introduced into a portion upstream of the intake throttle valve in the intake flow. The portion upstream of the intake throttle valve in the intake flow is of an approximately atmospheric pressure, so the differential pressure between the intake side and the exhaust side is small in the LP-EGR system as compared to that in the HP-EGR system. Thus, for example in a low-load operating region where the pressure on the exhaust side decreases, the pressure on the exhaust side may become lower than in the intake side due to exhaust pulsation, possibly causing backflow of the EGR gas. This arises a need, in the LP-EGR system, to provide an additional throttle valve (hereinafter, also called negative pressure generating valve) at a position upstream of the intake throttle valve in the intake flow, so as to secure the differential pressure between the intake side and the exhaust side necessary for introducing the EGR gas.

Incidentally, changing the opening degree of the negative pressure generating valve causes a change of a pressure (hereinafter, also called intake pressure) inside the intake passage from the negative pressure generating valve to the intake throttle valve. That is to say, even if the opening degree of the intake throttle valve and the opening degree of an EGR valve for adjusting the EGR ratio are unchanged, the intake air amount and the EGR ratio vary depending on the opening degree of the negative pressure generating valve. It is therefore difficult to accurately control the intake air amount and the EGR ratio by simply applying the control in the above document, as it is, to the LP-EGR system.

In view of the foregoing, an object of the present invention is to control the intake air amount and the EGR ratio with accuracy in an EGR system equipped with a negative pressure generating valve.

According to one embodiment of the present invention, an intake control method for an internal combustion engine comprising an intake throttle valve disposed in an intake passage and having a target opening degree set in accordance with a target fresh air amount determined for each operating point of the internal combustion engine, an EGR passage provided for communication between a portion in the intake passage upstream, in an intake flow, of the intake throttle valve and an exhaust passage, an EGR valve disposed in the EGR passage and having a target opening degree set in accordance with a target EGR gas amount determined for each said operating point, and a negative pressure generating valve disposed at a position in the intake passage upstream, in the intake flow, of a confluence with the EGR passage is provided. The control method comprising setting a target intake pressure, which is a target value of an intake pressure in the intake passage between the negative pressure generating valve and the intake throttle valve, necessary for performing EGR control in a state of an exhaust pressure determined for each said operating point. The control method also comprising setting a target total opening area, which is a sum of a target opening area of the EGR valve and a target opening area of the negative pressure generating valve, on the basis of the target intake pressure, the target fresh air amount, and the target EGR gas amount, and setting a target EGR valve opening area, which is an opening area of the EGR valve for achieving the target EGR gas amount, assuming that the negative pressure generating valve is fully open. Further, the control method comprising setting a value obtained by subtracting the target EGR valve opening area from the target total opening area to be a target negative pressure generating valve opening area, which is a target value of an opening area of the negative pressure generating valve.

DESCRIPTION OF EMBODIMENTS

An embodiment of the present invention will be described below with reference to the accompanying drawings.

Figure 1:
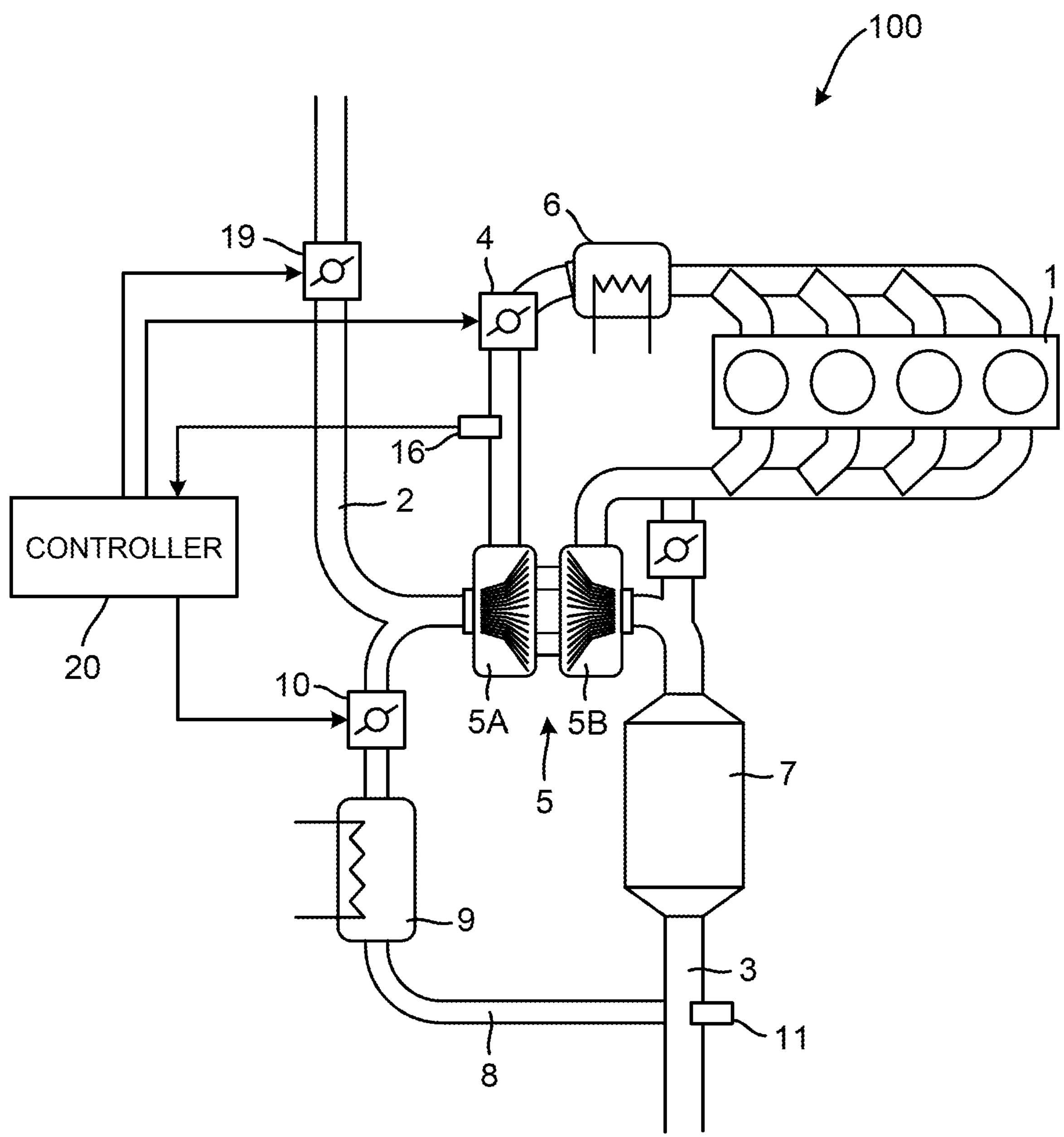
FIG. 1 is a schematic configuration diagram of an internal combustion engine system.

FIG. 1 is a schematic configuration diagram of an internal combustion engine system 100 according to a first embodiment.

An intake passage 2 has arranged thereon, from upstream in an intake flow, an air flow meter (not shown), a negative pressure generating valve (hereinafter, also called ADM/V) 19, a compressor 5A of a turbo supercharger 5, a throttle valve (hereinafter, also called TH/V) 4, and an intercooler 6.

While an intake air amount is detected using the air flow meter in the present embodiment, not limited thereto, the intake air amount may be detected or estimated in an arbitrary manner. For example, it may be estimated on the basis of, for example, the pressure in the intake passage 2 downstream of the TH/V 4 and the opening degree of the TH/V 4.

An exhaust passage 3 has arranged thereon, from upstream in an exhaust flow, a turbine 5B of the turbo supercharger 5, an exhaust gas purifying device 7, and an exhaust gas temperature sensor 11. The exhaust gas purifying device 7 is, for example, a three-way catalyst or an oxidation catalyst.

Although a description is given in the present embodiment of a case of using the turbo supercharger 5 which is driven by the energy of the exhaust gas of an internal combustion engine 1, not limited thereto, a mechanical supercharger or an electric supercharger, for example, may be adopted.

The internal combustion engine system 100 includes an exhaust gas recirculation passage (hereinafter, also called EGR passage) 8 that provides communication between a portion in the exhaust passage 3 downstream of the exhaust gas purifying device 7 and a portion in the intake passage 2 upstream of the compressor 5A. The EGR passage 8 has arranged thereon an EGR cooler 9 which cools the exhaust gas flowing through the EGR passage 8, and an EGR valve (hereinafter, also called EGR/V) 10 which controls the flow rate of the exhaust gas flowing through the EGR passage 8. The EGR passage 8, the EGR cooler 9, and the EGR/V 10 are collectively called an EGR device.

A controller 20 as a controlling unit reads a detection value of the air flow meter, and also reads detection values of a crank angle sensor, an accelerator position sensor, and others (which are not shown). On the basis of these detection values, the controller 20 performs controls including control of the opening degrees of the ADM/V 19, the TH/V 4, and the EGR/V 10, fuel injection control, and ignition timing control.

The controller 20 is constituted by a microcomputer which includes a central processing unit (CPU), a read only memory (ROM), a random access memory (RAM), and an input/output interface (I/O interface). The controller 20 may be constituted by a plurality of microcomputers.

The EGR device in the present embodiment is a so-called low-pressure EGR device (hereinafter, also called LP-EGR device) in which the EGR passage 8 is connected to a position upstream of the compressor 5A. It should be noted that the EGR ratio refers to a ratio of the EGR gas with respect to a total gas amount flowing into the internal combustion engine 1. The control for recirculating the EGR gas is called EGR control.

It is known that, when the EGR gas is recirculated, the opening degree of the TH/V 4 is increased by the amount of introduced EGR gas, which reduces the pumping loss, resulting in improved fuel economy performance. It is also known that, when the EGR gas is recirculated, the combustion temperature decreases and knocking resistance is improved, so the ignition timing retardation amount for preventing knocking is lessened, resulting in improved fuel economy performance. It is therefore desirable, for improving the fuel economy performance, to perform the EGR control in a wider operating region.

The EGR device utilizes a differential pressure between the exhaust side and the intake side, or in other words, the differential pressure across the EGR valve 10, to let the EGR gas introduced from the exhaust passage 3 into the intake passage 2. Thus, for performing the EGR control, the pressure on the intake side needs to be lower than that on the exhaust side. In the conventionally well-known high-pressure EGR device (also called HP-EGR device), that is, in the EGR device recirculating the EGR gas to a portion downstream of the throttle valve, the pressure on the intake side becomes a positive pressure in the supercharging region, making it impossible to perform the EGR control.

In contrast, the LP-EGR device recirculating the EGR gas to a portion upstream of the compressor 5A is capable of performing the EGR control even in the supercharging region, so the LP-EGR device can be said to be a device that is suitable for improving the fuel economy performance of the supercharged internal combustion engine.

It is noted that the exhaust pressure of the internal combustion engine 1 pulsates. In the LP-EGR device in which the differential pressure across the EGR valve 10 is small as compared to that in the HP-EGR device, the pressure on the exhaust side may become lower than the pressure on the intake side in a low-load region where the mean pressure of the exhaust gas decreases. In this case, the EGR gas may flow backward, making it difficult to achieve a target EGR gas amount which will be described later. Therefore, in order to prevent backflow of the EGR gas, the ADM/V 19 is used to generate a negative pressure between the ADM/V 19 and the compressor 5A.

A description will now be given of the control of the ADM/V 19, the EGR/V 10, and the TH/V 4 by the controller 20.

When the EGR control is performed, fresh air taken from the atmosphere and the EGR gas flow into the internal combustion engine 1.

A target value of fresh air amount (target fresh air amount) is determined in accordance with the accelerator position (accelerator opening degree). For example, a table setting a target fresh air amount for each load of the internal combustion engine 1 is created in advance and stored in the controller 20, and the load is used to search the table for setting the target fresh air amount. In the present embodiment, the accelerator position is used as an index indicating the load.

A target value of EGR gas amount (target EGR gas amount) is determined in accordance with the target fresh air amount and a target value (target EGR ratio) of the EGR ratio which is a ratio of the EGR gas amount with respect to the total gas amount. The target EGR ratio is determined in accordance with engine operation. For example, a map setting a target EGR ratio for each operating point is created in advance and stored in the controller 20, and the detected revolution speed and load are used to search the map.

The controller 20 sets a target opening degree of the TH/V 4 in accordance with the target fresh air amount determined for each operating point of the internal combustion engine 1, and controls the opening degree of the TH/V 4 on the basis of the target opening degree. Further, the controller 20 sets a target opening degree of the EGR/V 10 in accordance with the target EGR gas amount determined for each operating point of the internal combustion engine 1, and controls the opening degree of the EGR/V 10 on the basis of the target opening degree. However, as the opening degree of the ADM/V 19 changes, the pressure in the intake passage 2 (hereinafter, also called intake pressure) between the ADM/V 19 and the TH/V 4 changes. As the intake pressure changes, the fresh air amount and the EGR gas amount change even if the opening degree of the TH/V 4 and the opening degree of the EGR/V 10 are unchanged. That is to say, it is important how to control the ADM/V 19, the EGR/V 10, and the TH/V 4 for accurately performing the EGR control.

Figure 2:
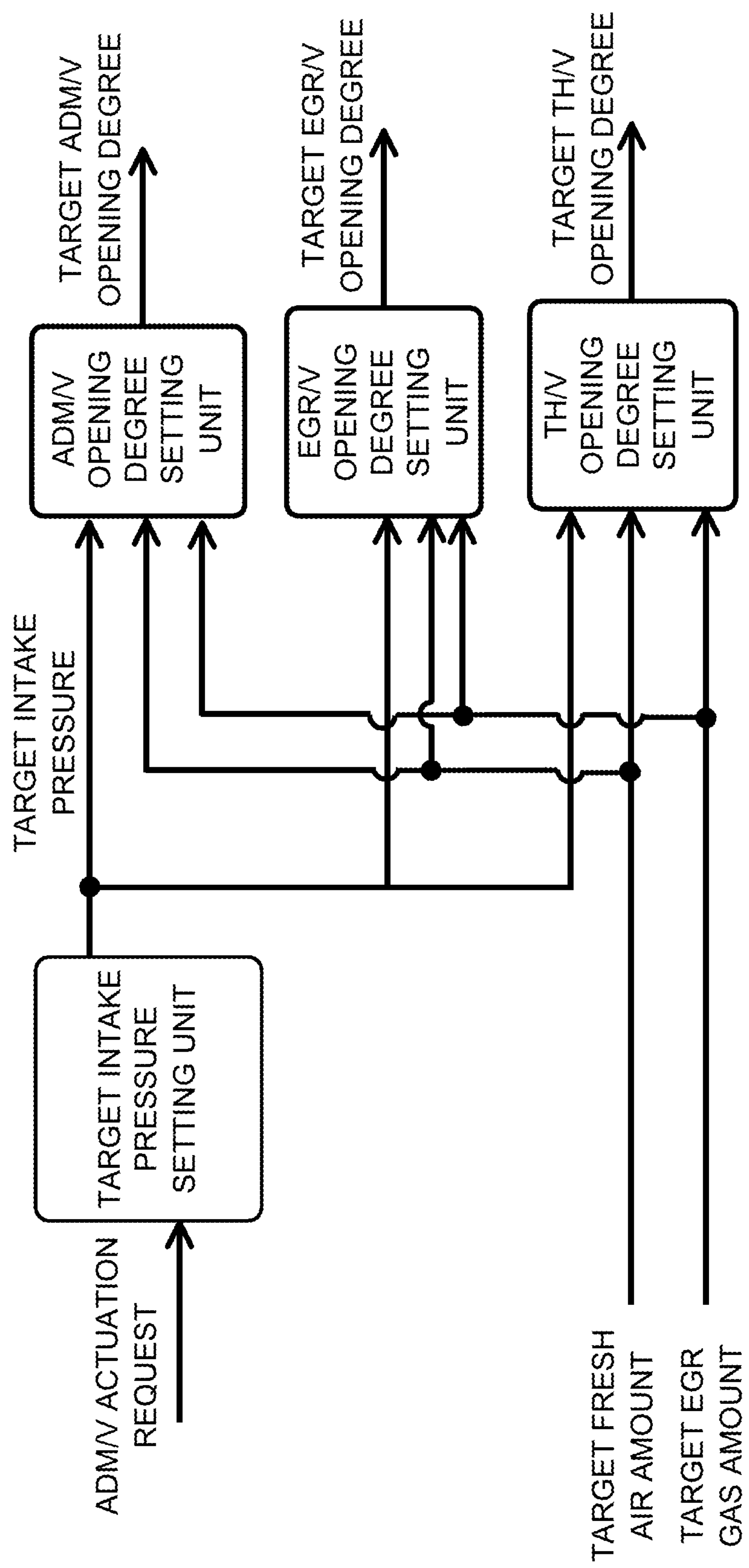
FIG. 2 is a block diagram illustrating a basic concept of intake control according to the present embodiment.

FIG. 2 is a block diagram illustrating a basic idea of the control of the ADM/V 19, the EGR/V 10, and the TH/V 4 in the present embodiment. FIG. 2 merely illustrates the basic idea; the specific control content is shown in FIG. 3, which will be described later.

In the present embodiment, when there is a request for actuation of the ADM/V 19, or, when the EGR control is to be performed in a low-load region where the mean pressure of the exhaust gas is low and the pressure on the exhaust side may become lower than the pressure on the intake side as explained before, the controller 20 sets a target intake pressure in a target intake pressure setting unit. The controller 20 also sets the target fresh air amount and the target EGR gas amount explained above.

The controller 20 then sets target opening degrees of the ADM/V 19, the EGR/V 10, and the TH/V 4, on the basis of the target intake pressure, the target fresh air amount, and the target EGR gas amount. This makes it possible to accurately control the target fresh air amount and the target EGR gas amount while achieving the target intake pressure.

Figure 3:
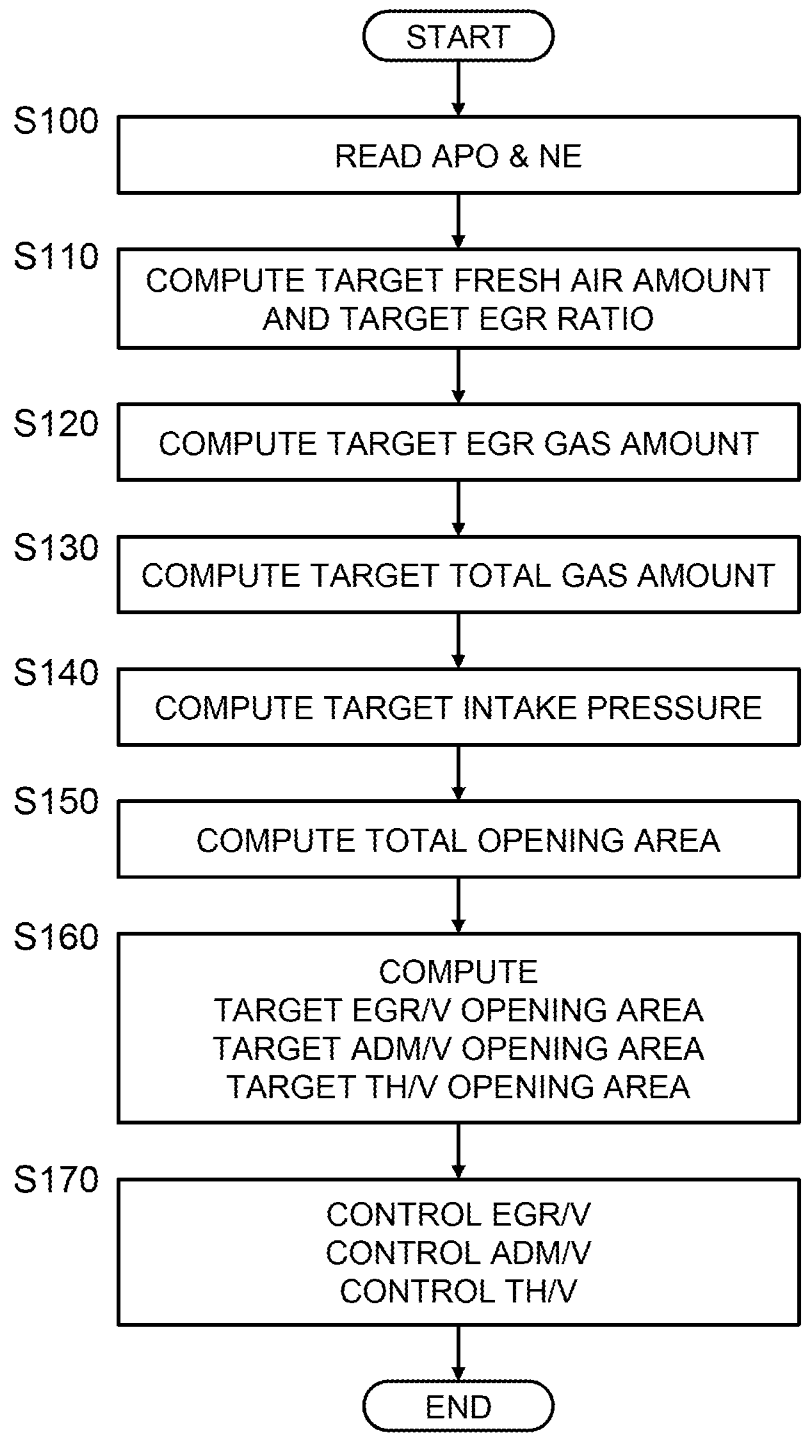
FIG. 3 is a flowchart illustrating an intake control routine according to the present embodiment.

FIG. 3 is a flowchart of a control routine performed by the controller 20 on the basis of the above-described idea. When the EGR control is performed, this control routine is repeated at short time intervals of the order of several milliseconds, for example. It should be noted that the ADM/V 19 is fully open when no EGR control is performed.

In step S100, the controller 20 reads the accelerator position APO and the revolution speed NE of the internal combustion engine 1. The accelerator position APO is used as the index indicating the magnitude of the load of the internal combustion engine 1, as explained before.

In step S110, the controller 20 calculates a target fresh air amount and a target EGR ratio. The target fresh air amount is calculated by searching a table created in advance, as explained before. In the table, a larger target fresh air amount is set as the accelerator opening degree APO becomes larger.

Figure 4:
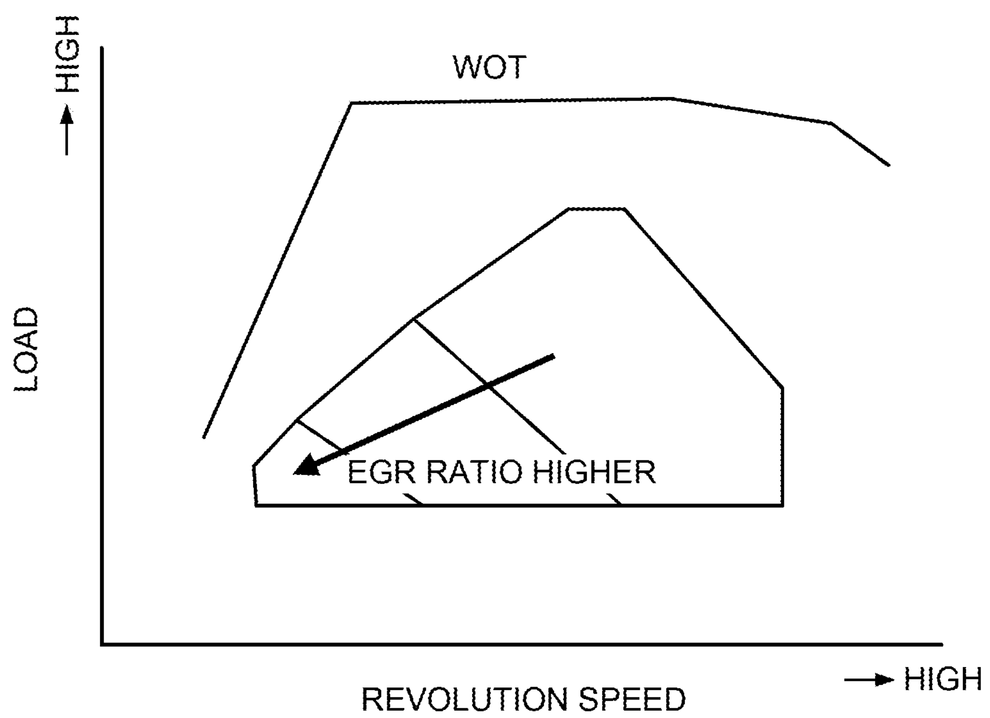
FIG. 4 shows an exemplary EGR map.

The target EGR ratio is calculated by searching a map created in advance, as explained before. FIG. 4 is an example of the target EGR ratio map. An EGR region is set in a portion of the operating region determined by the load and the revolution speed. Inside the EGR region, a higher target EGR ratio is set as the revolution speed becomes lower and as the load becomes smaller.

In step S120, the controller 20 calculates a target EGR gas amount by multiplying the target fresh air amount by the target EGR ratio.

In step S130, the controller 20 calculates a target total gas amount. The target total gas amount is a sum of the target fresh air amount and the target EGR gas amount.

In step S140, the controller 20 sets a target intake pressure in the following manner. Firstly, the controller 20 calculates a pressure in the exhaust passage 3 (hereinafter, also called exhaust pressure) assuming that the fresh air of the amount at the operating point determined by the accelerator position APO and the revolution speed NE read in the step S100 has been combusted. Then, the intake pressure necessary for performing the EGR control in the calculated state of the exhaust pressure is set to be a target intake pressure Pt. For example, a pressure that is lower by several pascals than the calculated exhaust pressure is set to be the target intake pressure Pt. It should be noted that a pressure that is lower by several pascals than the atmospheric pressure may be set to be the target intake pressure Pt, without performing the above computation. Further, when the calculated exhaust pressure is sufficiently high, the target intake pressure Pt becomes almost equal to the atmospheric pressure, in which case the ADM/V 19 may be in a fully opened state.

Figure 5:
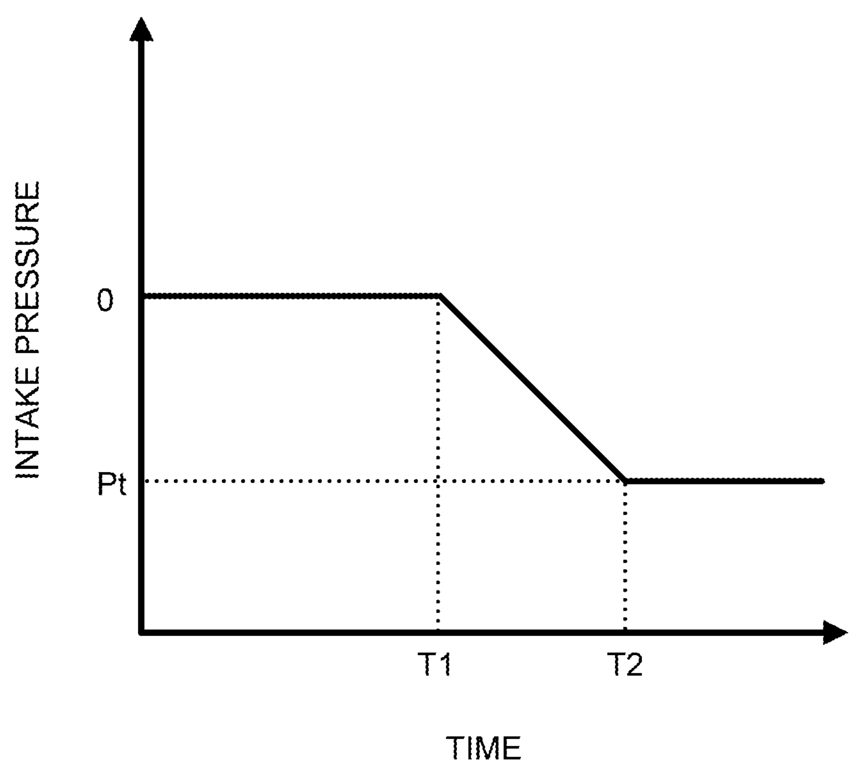
FIG. 5 shows an exemplary intake pressure profile.

The controller 20 sets, not only the target intake pressure Pt, but also a profile of the change of the intake pressure as it changes from the current state (of approximately atmospheric pressure) to the target intake pressure Pt. FIG. 5 shows an example of such a profile, in which the EGR control is started at a timing T1. Before the timing T1, the ADM/V 19 is fully open, with no EGR control performed. The intake pressure is therefore approximately the atmospheric pressure. From the timing T1 to a timing T2, the intake pressure changes from the atmospheric pressure to the target intake pressure Pt. It takes several tenths of seconds, for example, from the timing T1 to the timing T2. Setting such a change profile for a target intake pressure Pt can suppress a variance of the actual intake pressure from the target intake pressure Pt due to the delay time from when the ADM/V 19 is actuated to when the actual intake pressure changes. As a result, it is possible to prevent a control error attributable to such a variance.

In step S150, on the basis of the target total gas amount and the target intake pressure, the controller 20 calculates a total opening area, which is a sum of the opening area of the ADM/V 19 and the opening area of the EGR/V 10, in the following manner.

The total gas amount flowing into the internal combustion engine 1 is a sum of the amount of fresh air having passed through the ADM/V 19 and the amount of EGR gas having passed through the EGR/V 10. In a state where the exhaust pressure is low to the extent that there is a need to generate a negative pressure using the ADM/V 19, the differential pressure across the EGR/V 10 and the differential pressure across the ADM/V 19 can be deemed to be equal to each other. Thus, in the commonly known expression (1) concerning a fluid passing through a valve, by setting the target total gas amount as the flow rate Q and a differential pressure between the target intake pressure and the atmospheric pressure as the differential pressure Δp, the effective cross-sectional area A is calculated, and this is set to be the total opening area.

$$Q = Cv \times A \times (2 \cdot \Delta p / \rho)^{1/2} \tag{1}$$

where Q: flow rate, Cv: flow rate coefficient, A: effective cross-sectional area, Δp: differential pressure, and ρ: density.

In step S160, the controller 20 calculates the target opening areas of the EGR/V 10, the ADM/V 19, and the TH/V 4 in the following manner.

Firstly, the controller 20 calculates a target opening area of the EGR/V 10. The opening area of the EGR/V 10 giving a target EGR gas amount, assuming that the ADM/V 19 is in a fully opened state, is examined in advance for each operating point determined by the load (for example, accelerator position APO) and the revolution speed NE of the internal combustion engine 1, and stored as a target EGR/V opening area in the controller 20. The controller 20 corrects the target EGR/V opening area in accordance with the target intake pressure and the current intake pressure, on the basis of the profile set in the step S140.

Here, a description will be given of the above correction. As a target intake pressure is lower, the differential pressure with the pressure in the exhaust passage increases, making the EGR gas more readily circulate. Therefore, the EGR/V opening area when the intake pressure reaches the target intake pressure is corrected to be smaller as the target intake pressure is lower. Similarly, during the process through which the intake pressure reaches the target intake pressure, the differential pressure with the pressure in the exhaust passage gradually increases, so the correction is applied in the direction of gradually decreasing the opening area.

Figure 6:
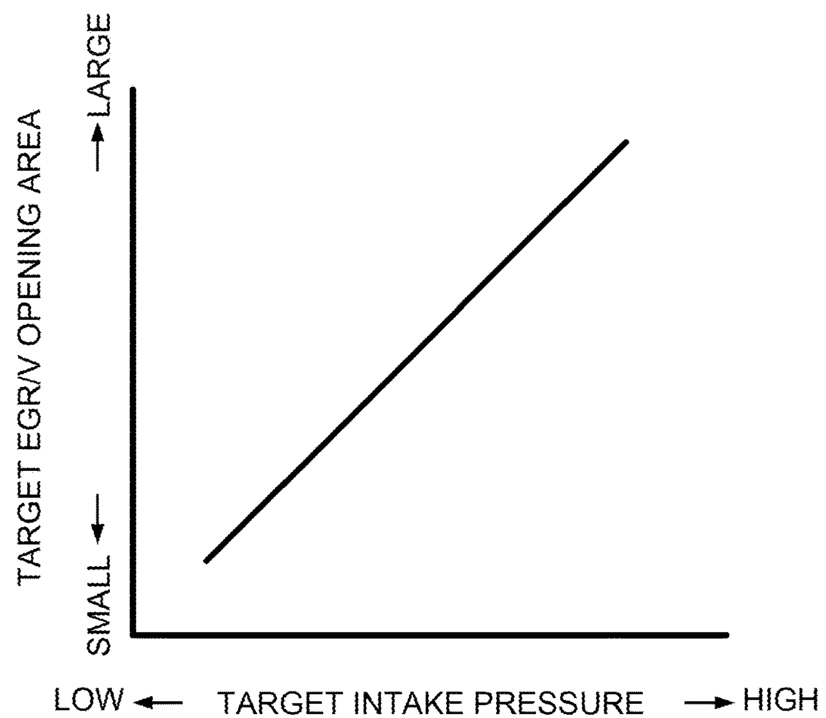
FIG. 6 is a graph showing a relationship between a target EGR valve opening area and a target intake pressure.

FIG. 6 illustrates a relationship between a target intake pressure and a target EGR/V opening area after the above correction has been applied, with a horizontal axis indicating a target intake pressure and a vertical axis indicating a target EGR/V opening area when the intake pressure reaches a target intake pressure. While the characteristic line of the target EGR/V opening area with respect to the target intake pressure is a straight line in FIG. 6, this is merely an example; the characteristic line may become a curve with the target EGR/V opening area monotonically increasing as the target intake pressure becomes higher.

The opening area and the opening degree of the EGR/V 10 have a correlation that the opening area increases with increasing opening degree. Thus, the vertical axis in FIG. 6 can be replaced with the target EGR/V opening degree. That is to say, the correction described above can be rephrased that the EGR/V opening degree when the intake pressure reaches the target intake pressure is corrected to be smaller as the target intake pressure is lower.

Next, the controller 20 subtracts the target EGR/V opening area from the total opening area, to obtain a target ADM/V opening area.

The way of calculating a target TH/V opening area is basically identical to the way of calculating the target EGR/V opening area. The controller 20 stores, as a target TH/V opening area, the opening area of the TH/V 4 that gives the target fresh air amount, assuming that the ADM/V 19 is in a fully opened state, for each operating point determined by the load (for example, accelerator position APO) and the revolution speed NE of the internal combustion engine 1. The controller 20 corrects the target TH/V opening area in accordance with the target intake pressure and the current intake pressure.

Here, a description will be given of the above correction. As a target intake pressure is lower, the opening degree of the ADM/V 19 is controlled to be smaller, making it difficult for the fresh air to pass therethrough. Therefore, the TH/V opening area when the intake pressure reaches the target intake pressure is corrected to be larger as the target intake pressure is lower. Similarly, during the process through which the intake pressure reaches the target intake pressure, the opening degree of the ADM/V 19 gradually decreases, so the correction is applied in the direction of gradually increasing the opening area.

Figure 7:
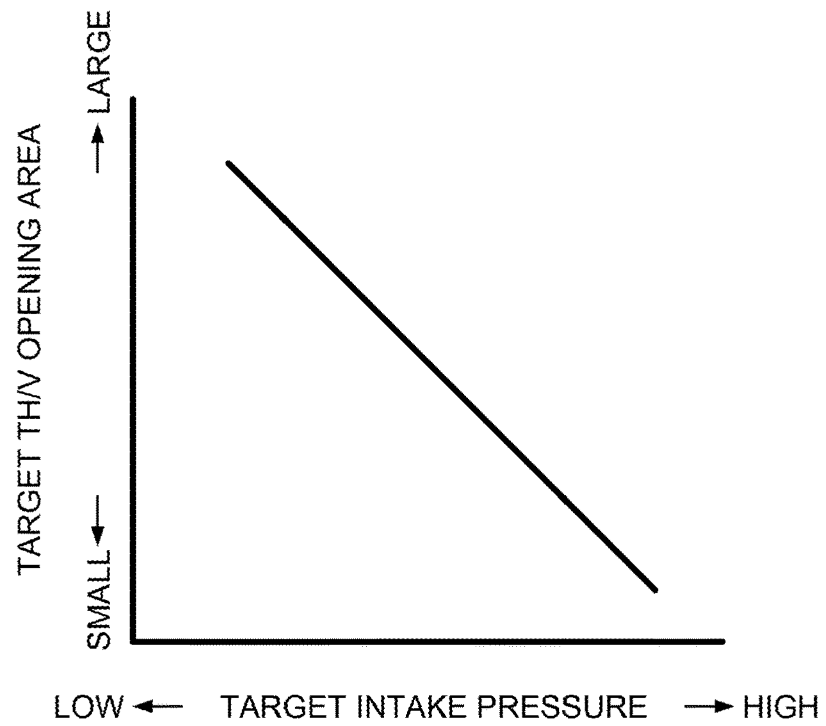
FIG. 7 is a graph showing a relationship between a target throttle valve opening area and a target intake pressure.

FIG. 7 illustrates a relationship between a target intake pressure and a target TH/V opening area after the above correction has been applied, with a horizontal axis indicating a target intake pressure and a vertical axis indicating a target TH/V opening area when the intake pressure reaches a target intake pressure. While the characteristic line of the target TH/V opening area with respect to the target intake pressure is a straight line in FIG. 7, this is merely an example; the characteristic line may become a curve with the target TH/V opening area monotonically decreasing as the target intake pressure becomes higher.

The opening area and the opening degree of the TH/V 4 have a correlation that the opening area increases with increasing opening degree. Thus, the vertical axis in FIG. 7 can be replaced with the target TH/V opening degree. That is to say, the correction described above can be rephrased that the TH/V opening degree when the intake pressure reaches the target intake pressure is corrected to be larger as the target intake pressure is lower.

After calculating the target opening areas of the EGR/V 10, the ADM/V 19, and the TH/V 4 as described above, in step S170, the controller 20 controls the EGR/V 10, the ADM/V 19, and the TH/V 4 to attain their respective target opening areas. In this control, for example, the target opening areas are converted to target opening degrees on the basis of the relationship between the opening degree and the opening area of the respective valves 10, 19, and 4 examined in advance, and the opening degrees of the valves 10, 19, and 4 are made to agree with their respective target opening degrees.

Figure 8:
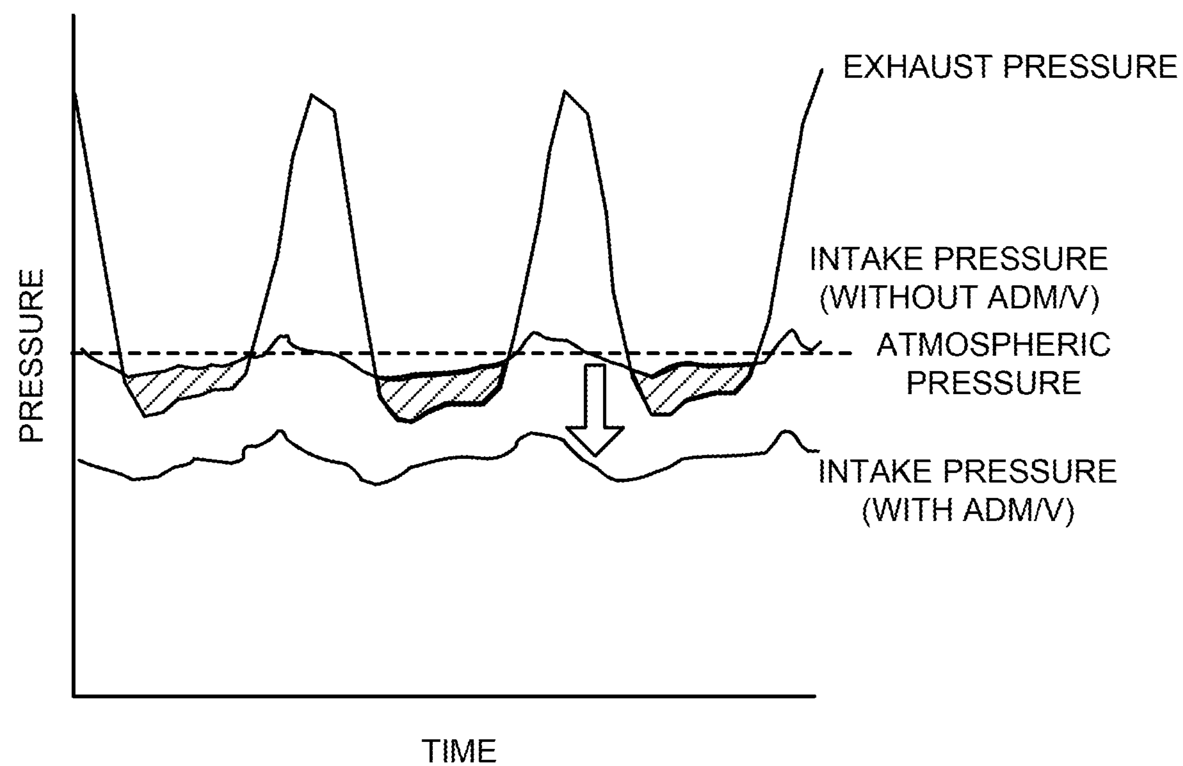
FIG. 8 is a graph showing an effect of the present embodiment.

FIG. 8 illustrates actions and effects of the control routine in FIG. 3; it shows a relationship between the exhaust pressure and the intake pressure in a low-load region of the internal combustion engine 1, with the vertical axes representing pressure and the horizontal axis representing time.

In a state where the exhaust pressure is low as in the low-load region, the exhaust pressure may fall below the atmospheric pressure in the valleys of the exhaust pulsation, as shown in FIG. 8. In the absence of the ADM/V 19, or when the ADM/V 19 is fully open, the intake pressure of the LP-EGR device can be deemed to be an approximately atmospheric pressure, although it may vary due to intake pulsation. Thus, in the valleys of the exhaust pulsation, the exhaust pressure may become lower than the intake pressure (shaded portions in the figure). With the exhaust pressure lower than the intake pressure, the EGR gas will flow backward from the intake side to the exhaust side, making it difficult to perform accurate EGR control.

In contrast, in the present embodiment, the ADM/V 19 is used to lower the intake pressure to prevent the exhaust pressure from becoming lower than the intake pressure, so there is no backflow of the EGR gas. Further, for lowering the intake pressure, the opening degrees of the ADM/V 19, the EGR/V 10, and the TH/V 4 are controlled on the basis of the target intake pressure and the target total gas amount, or, taking into consideration the influence of the opening degree (opening area) of the ADM/V 19 based on the target intake pressure. It is therefore possible to accurately perform the EGR control, while securing a torque demanded by the driver.

As described above, in the present embodiment, as the method for controlling the internal combustion engine 1 equipped with the LP-EGR device, the controller 20 sets a target intake pressure, which is a target value of intake pressure in the intake passage 2 between the ADM/V 19 and the TH/V 4, and a target fresh air amount, which is a target value of the amount of fresh air to be taken from the atmosphere, according to the operating point of the internal combustion engine 1. The controller 20 further sets a target EGR gas amount, which is a target value of the amount of EGR gas to be recirculated from the exhaust passage 3 to the intake passage 2 via the EGR passage 8, according to the operating point of the internal combustion engine 1. Then, by setting a sum of the target fresh air amount and the target EGR gas amount as a target total gas amount, the controller 20 controls the TH/V 4, the EGR/V 10, and the ADM/V 19 on the basis of the target intake pressure and the target total gas amount. In this manner, it is possible to accurately perform the EGR control, while securing a torque demanded by the driver.

In the present embodiment, the controller 20 sets a target total opening area, which is a sum of a target opening area of the EGR/V 10 and a target opening area of the ADM/V 19, on the basis of the target intake pressure and the target total gas amount. Further, the controller 20 sets a target EGR valve opening area, which is an opening area of the EGR/V 10 for achieving the target EGR gas amount, assuming that the ADM/V 19 is fully open. The controller 20 sets a value obtained by subtracting the target EGR valve opening area from the target total opening area to be a target ADM/V opening area, which is a target value of the opening area of the ADM/V 19. With this, the movements of the ADM/V 19 and the EGR/V 10 can be coordinated with each other. As a result, it is possible to achieve the target EGR ratio and the target fresh air amount while achieving the target intake pressure.

In the present embodiment, the controller 20 applies a correction such that the target opening degree of the TH/V becomes larger and the target opening degree of the EGR/V becomes smaller as the target intake pressure is lower. This makes it possible to accurately control the fresh air amount and the EGR gas amount in accordance with the target intake pressure.

In the present embodiment, the controller 20 corrects the target EGR valve opening area such that it becomes smaller as the intake pressure becomes lower. In other words, the controller 20 corrects the target EGR/V opening area in accordance with the profile through which the intake pressure reaches the target intake pressure. With this, it is possible to perform the EGR control with accuracy even in a transient state until the target intake pressure is reached.

In the present embodiment, the controller 20 corrects the opening area of the TH/V 4 such that it becomes larger as the intake pressure becomes lower. In other words, the controller 20 corrects the target TH/V opening area in accordance with the profile through which the intake pressure reaches the target intake pressure. With this, it is possible to control the total gas amount with accuracy even in a transient state until the target intake pressure is reached.

Particularly, in the present embodiment, the controller 20 corrects the target EGR/V opening area and the target TH/V opening area in accordance with the profile through which the intake pressure reaches the target intake pressure. Thus, even in the transient state, it is possible to accurately control the target fresh air amount, together with the total gas amount and the EGR gas amount, and achieve the torque demanded by the driver.

Although a description has been given above of the embodiment of the present invention, the embodiment shows only a part of an application example of the present invention, and is not intended to limit the technical scope of the present invention to the specific configurations in the embodiment.

The invention claimed is:

1. An intake control method for an internal combustion engine, the internal combustion engine comprising:

an intake throttle valve disposed in an intake passage, a target opening degree of the intake throttle valve set in accordance with a target fresh air amount determined for each operating point of the internal combustion engine, an EGR passage provided for communication between a portion in the intake passage upstream, in an intake flow, of the intake throttle valve and an exhaust passage, an EGR valve disposed in the EGR passage, a target opening degree of the EGR valve set in accordance with a target EGR gas amount determined for each said operating point, a negative pressure generating valve disposed at a position in the intake passage upstream, in the intake flow, of a confluence with the EGR passage, and a controller, the intake control method comprising:

setting a target intake pressure, where the target intake pressure is a target value of an intake pressure in the intake passage between the negative pressure generating valve and the intake throttle valve, where the target intake pressure is the intake pressure required for performing EGR control in a state of an exhaust pressure determined for each said operating point;

setting a target total opening area, the target total opening area being a sum of a target opening area of the EGR valve and a target opening area of the negative pressure generating valve, on the basis of the target intake pressure, the target fresh air amount, and the target EGR gas amount;

setting a target EGR valve opening area, the target EGR valve opening area being an opening area of the EGR valve for achieving the target EGR gas amount, upon the negative pressure generating valve being fully open;

setting a value obtained by subtracting the target EGR valve opening area from the target total opening area to be a target negative pressure generating valve opening area, the target negative pressure generating valve opening area being a target value of an opening area of the negative pressure generating valve; and controlling the negative pressure generating valve based on the target negative pressure generating valve opening area.

2. The intake control method for an internal combustion engine according to claim 1, further comprising:

applying a correction to make the target opening degree of the intake throttle valve larger and the target opening degree of the EGR valve smaller as the target intake pressure is lower.

3. The intake control method for an internal combustion engine according to claim 2, wherein the correction is applied to make the target EGR valve opening area smaller as the target intake pressure becomes lower.

4. The intake control method for an internal combustion engine according to claim 2, wherein the correction is applied to make an opening area of the intake throttle valve larger as the target intake pressure becomes lower.

5. An intake control device for an internal combustion engine, the device comprising:

an intake throttle valve disposed in an intake passage, a target opening degree of the intake throttle valve set in accordance with a target fresh air amount determined for each operating point of the internal combustion engine;

an EGR passage provided for communication between a portion in the intake passage upstream, in an intake flow, of the intake throttle valve and an exhaust passage;

an EGR valve disposed in the EGR passage, a target opening degree of the EGR valve set in accordance with a target EGR gas amount determined for each said operating point;

a negative pressure generating valve disposed at a position in the intake passage upstream, in the intake flow, of a confluence with the EGR passage; and a controller configured to control the intake throttle valve, the EGR valve, and the negative pressure generating valve, the controller configured to:

set a target intake pressure, wherein the target intake pressure is a target value of an intake pressure in the intake passage between the negative pressure generating valve and the intake throttle valve, wherein the target intake pressure is the intake pressure required for performing EGR control in a state of an exhaust pressure determined for each said operating point, set a target total opening area, the target total opening area being a sum of a target opening area of the EGR valve and a target opening area of the negative pressure generating valve, on the basis of the target intake pressure, the target fresh air amount, and the target EGR gas amount, set a target EGR valve opening area, the target EGR valve opening area being an opening area of the EGR valve for achieving the target EGR gas amount, upon the negative pressure generating valve being fully open, set a value obtained by subtracting the target EGR valve opening area from the target total opening area to be a target negative pressure generating valve opening area, the target negative pressure generating valve opening area being a target value of an opening area of the negative pressure generating valve, and control the negative pressure generating valve based on the target negative pressure generating valve opening area.

* * * * *